United States Patent [19]

Ito

[11] Patent Number: 5,209,525

[45] Date of Patent: May 11, 1993

[54] BONDED CERAMIC STRUCTURE

[75] Inventor: Kazuhiko Ito, Seto, Japan

[73] Assignee: NGK Insulators, Ltd., Japan

[21] Appl. No.: 674,924

[22] Filed: Mar. 26, 1991

[30] Foreign Application Priority Data

| Mar. 28, 1990 | [JP] | Japan | 2-80084 |
| Mar. 28, 1990 | [JP] | Japan | 2-80085 |
| Mar. 28, 1990 | [JP] | Japan | 2-80086 |
| Mar. 28, 1990 | [JP] | Japan | 2-80087 |
| Mar. 28, 1990 | [JP] | Japan | 2-80088 |

[51] Int. Cl.$^5$ ............................................. F16L 39/00
[52] U.S. Cl. .................................. 285/137.1; 285/911; 285/915; 285/906
[58] Field of Search ............... 285/137.1, 19, 915, 285/911, 289, 906

[56] References Cited

U.S. PATENT DOCUMENTS

| 618,837 | 2/1899 | Callaway | 285/137.1 X |
| 2,000,653 | 5/1935 | Wilkinson | 285/19 X |
| 2,782,806 | 2/1957 | Stambaugh et al. | 285/915 X |
| 3,048,433 | 8/1962 | Doetsch | 285/915 X |
| 3,471,178 | 10/1969 | Roe | 285/137.1 |
| 3,782,450 | 1/1974 | Swozil | 285/915 X |
| 4,171,832 | 10/1979 | Metcalfe | 285/911 X |
| 4,445,715 | 5/1984 | Inoue et al. | 285/911 X |
| 4,601,493 | 7/1986 | Ross et al. | 285/911 X |

FOREIGN PATENT DOCUMENTS 2932107 1/1981 Fed. Rep. of Germany ...... 285/915

Primary Examiner—Dave W. Arola
Attorney, Agent, or Firm—Parkhurst, Wendel & Rossi

[57] ABSTRACT

A bonded ceramic structure is fabricated by inserting a plurality of ceramic tubular members respectively in holes formed in a perforated ceramic plate member and bonding the same to the perforated ceramic plate. A clearance is formed between the outer circumference of the tubular member or that of a ceramic sleeve fitted on the tubular member, and the surface of the hole, and the clearance is filled up with a bonding material forming a bonding layer to join the tubular members to the plate by a high strength at a high positional accuracy. A method of fabricating such a bonded ceramic structure spreads a fusible bonding material on at least one major surface of the plate member, inserts the tubular members in the holes of the plate member, and fuses the bonding material so that the fused bonding material flows into the clearance between the surface of each hole and the tubular member to form a bonding layer continuously extending over the surface of the plate and in the clearances.

18 Claims, 11 Drawing Sheets

FIG.4
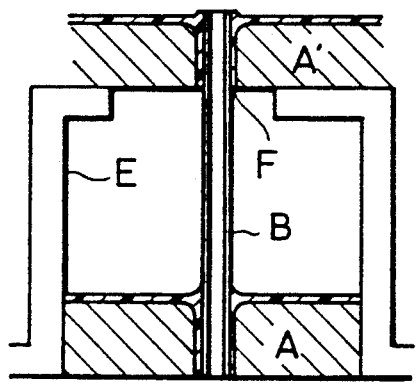
FIG.5(a)
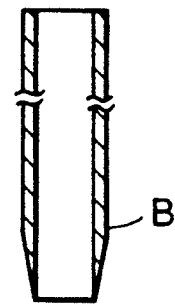
FIG.5(b) FIG.5(c) FIG.5(d)
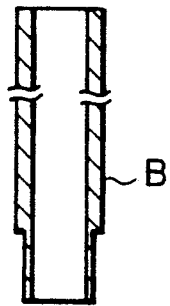 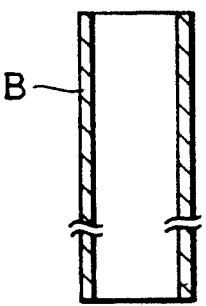 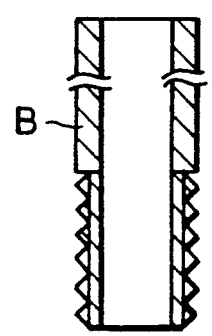

FIG.8(a')
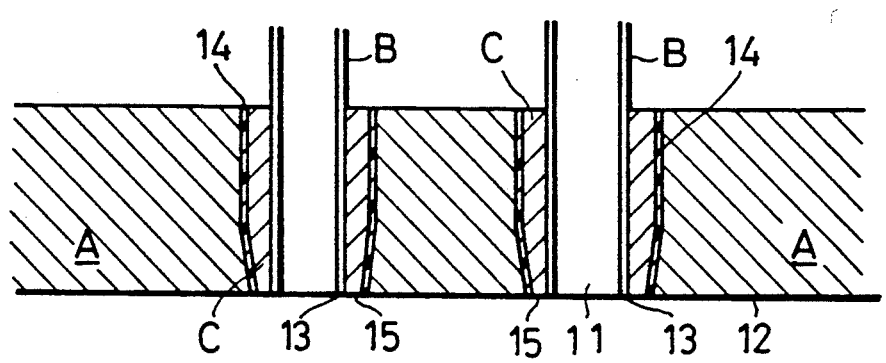
FIG.8(b')
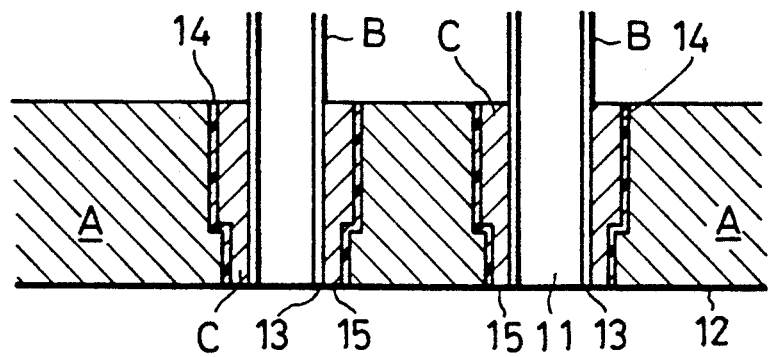
FIG.8(c)
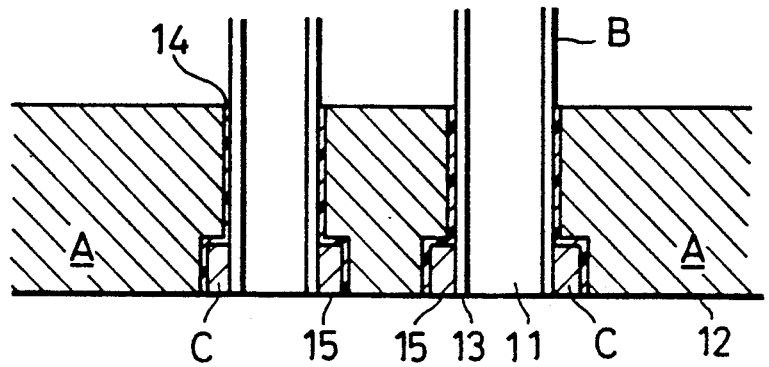

FIG.8(d')

BONDED CERAMIC STRUCTURE

BACKGROUND OF THE INVENTION AND RELATED ART STATEMENT

The present invention relates to a bonded ceramic structure constructed by joining ceramic tubular members, to a ceramic plate, and a method thereof More specifically, the present invention relates to a bonded ceramic structure constructed by inserting ceramic tubular members respectively in holes formed in a ceramic plate and bonding the ceramic tubular members to the ceramic plate, and a method of joining together the ceramic plate and the ceramic tubular members.

Research has been made to develop ceramics and ceramics have been used for forming various structures owing to their high heat resistance, heat insulating capability, electronic and electrical functions, including electrical insulating function, conductivity, magnetic function and dielectric function, and excellent mechanical properties including high abrasion resistance, regardless of their compositions, whether oxide or non-oxide. When used for forming machine parts and structures, ceramic materials must be able to be formed in various shapes, and the ceramic parts or members need to be combined with each other therefore, it is necessary for the ceramic parts to be bonded firmly together, except for those produced by monoblock molding.

Many bonded structures each formed by combining a flat member with a member other than flat members are found in machine parts and structural members. A ceramic heat exchanger for an industrial furnace proposed previously by the applicant of the present patent application in Japanese Patent Laid-open (Kokai) No. 60-62592 employs a device constructed by fastening a large number of tubular members to plate-shaped members.

Trials have been made to apply ceramics to such machine parts and structural members. As a method of fastening ceramic tubular members inserted in holes formed in a ceramic plate to the ceramic plate, as shown in FIG. 11, the method of providing an adhesion layer (12) in the gap between the surface of the hole (11) of the plate (A) and the tubular member (B) has been employed. This method, however, was unable to obtain a sufficient sealing effect and fastening strength, when used in a heat exchanger, for instance. A method disclosed in Japanese Patent Laid-Open (Kokai) No. 60-62592 using a compression spring for joining sphericities also has been employed generally. FIG. 12 is a sectional view of a joint employed in a shell-and-tube heat exchanger disclosed in Japanese Patent Laid-open (Kokai) No. 60-62592. As shown in FIG. 12, spherical surfaces formed in the opposite ends of a tubular member B are fastened to spherical surfaces formed in the respective inner ends of through holes X and X' formed respectively in plates A and A' to form spherical joints Y by mechanical pressing. However, the tubular member is likely to be damaged by thermal stress during operation. Gaps were often formed in the spherical joints due to thermal expansion and thermal contraction; dust contained in the gas supplied to the heat exchanger leaked through the gaps; and dust deposited on the joints deteriorated the sealing effect of the spherical joint.

Accordingly, the development of a bonded ceramic structure comprising component ceramic members fastened together in accurate positional relation, and having uniform joints, and a method thereof has been desired to eliminate such drawbacks in the conventional bonded ceramic structures.

SUMMARY OF THE INVENTION

In view of such a present status of art concerned, it is an object of the present invention to provide a bonded ceramic structure comprising ceramic plates, and a plurality of ceramic tubular members passed through or inserted in holes formed in the ceramic plate and joined thereto in a satisfactorily sealed condition so as to form firm joints having a high joining strength.

Another object of the present invention is to provide a bonded ceramic structure comprising ceramic plates, and a plurality of ceramic tubular members inserted in holes formed in the ceramic plates and physically and chemically bonded to the ceramic plates by a high bonding strength without employing any mechanical joining means so as to form uniform, firm joints.

The present invention provides a bonded ceramic structure having a high positional accuracy and a high bonding strength, and comprises a perforated ceramic plate member with a plurality of holes and ceramic tubular members each having at least one end inserted in the holes each with a predetermined clearance between the outer circumference thereof and the surface of the corresponding hole, wherein each clearance is filled with a bonding material forming a bonding layer so that the ceramic tubular members are fixedly bonded to the plate member.

The present invention further provides a bonded ceramic structure having a high positional accuracy and a high bonding strength, and comprises a perforated ceramic plate member with a plurality of holes, ceramic sleeve members each fitted in the holes each with a predetermined clearance between the outer circumference thereof and the surface of the corresponding hole, and ceramic tubular members each having one end inserted into the ceramic sleeve, wherein each clearance is filled with a bonding material forming a bonding layer so that the ceramic tubular members are fixedly bonded to the plate member.

A preferable size of the clearance between the surface of the hole and the outer circumference of the ceramic sleeve interposed between the ceramic plate and the ceramic tubular member, in general, is in the range of 0.05 to 0.5 mm.

In a bonded ceramic structure in accordance with the present invention, the bonding layer is formed continuously at least over one of the major surfaces of the ceramic plate perpendicular to the hole. The present invention provides a joining method of spreading a bonding material that is fluidized by fusion at least on one of the major surfaces of the ceramic plate perpendicular to the holes, inserting the ceramic tubular members in the holes, and fusing the bonding material so that a continuous bonding layer is formed over the major surface of the ceramic plate and the clearance between each ceramic tubular member and the surface of the corresponding hole of the ceramic plate.

In the bonded ceramic structure in accordance with the present invention, the holes are tapered and/or stepped holes, and the corresponding surfaces of the ceramic sleeves or the ceramic tubular members are tapered and/or stepped accordingly.

In the bonded ceramic structure in accordance with the present invention, a recess is formed in a portion of the surface of each hole, and the sleeve is inserted in the recess.

In the bonded ceramic structure in accordance with the present invention, each hole is a threaded hole, and an external thread capable of engaging the threaded hole is formed in the corresponding portion of the ceramic tubular member.

In the bonded ceramic structure in accordance with the present invention, a second ceramic plate provided with second holes each having a diameter not less than the inside diameter of the ceramic tubular members and not greater than the outside diameter of the ceramic tubular members and respectively corresponding to the holes of the ceramic plate is placed in contact with the surface of the ceramic plate and the ends of the ceramic tubular members inserted in the holes of the ceramic plates with the second holes thereof in coaxial alignment respectively with the holes of the ceramic plate, and the bonding layer is formed over the entire surface of the ceramic plate contiguous with the second ceramic plate.

In a bonded ceramic structure in accordance with the present invention, a recess is formed in a portion of each hole, and each ceramic tubular member is provided at its end with a flange mating with the recess.

Furthermore, the present invention provides a method of joining ceramic tubular members to a ceramic plate provided with a plurality of holes perpendicular to the major surfaces thereof, comprising steps of spreading a bonding material capable of being fluidized by fusion on at least one of the major surfaces of the ceramic plate, inserting the ceramic tubular members respectively in the holes, and bonding the ceramic tubular members to the ceramic plate by spreading the bonding material over the major surface of the ceramic plate and in the clearances between the surface of each hole and the outer circumference of the ceramic tubular member inserted in the hole.

BRIEF DESCRIPTION OF THE DRAWINGS

FIGS. 2, 3(a), 3(b) and 4 are fragmentary sectional views of a bonded ceramic structure in a preferred embodiment according to the present invention;

FIGS. 5(a) to 5(d) are sectional views of ceramic tubular members respectively for bonded ceramic structures in preferred embodiments according to the present invention;

DETAILED DESCRIPTION OF THE PREFERRED EMBODIMENTS

A proper ceramic material for forming a bonded ceramic structure in accordance with the present invention may be chosen from among ceramic materials of oxides and those of substances other than oxides, according to the structural members in which the bonded ceramic structure is used, and working conditions including required mechanical strength. For example, silicon nitride and silicon carbide, which have high strength and high heat resistance, are suitable ceramic materials for a bonded ceramic structure to be applied to an industrial machine, a heat exchanger or the like. Ceramic materials forming a ceramic plate and a ceramic tubular member to be joined to the ceramic plate may be the same or different from each other.

There is no particular restriction on the shape and dimensions including thickness of a ceramic plate for a bonded ceramic structure in accordance with the present invention. When first and second ceramic plates joined together are used in forming a bonded ceramic structure, it is preferable that the first and second ceramic plates have the same shape.

Figure 1:
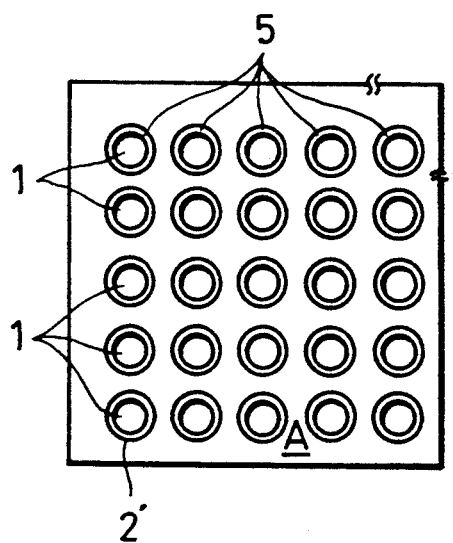
FIG. 1 is a plane view of a ceramic plate provided with a plurality of holes in accordance with the present invention.

In accordance with the present invention holes formed in a ceramic plate are perpendicular to the major surfaces of the ceramic plate. There is no particular restriction on the number, size, arrangement and shape of the holes; the number, size, arrangement and shape of the holes are selected according to the number, size and shape of the ceramic tubular members or ceramic sleeves, and to the purpose. The shape of the holes are dependent on the shape of the ceramic tubular members of ceramic sleeves. For example, as shown in FIGS. 7(a) to 7(d) and 10, the holes may be tapered, stepped, internally threaded or combined therewith. When two ceramic plates, i.e., first and second ceramic plates, are used, holes respectively of analogous shapes and different diameters are formed coaxially in the same arrangement in the first and second ceramic plates, and the number, shapes and diameters of the holes are dependent on the number, shape and diameter of ceramic tubular members, and on the purpose. Holes in a ceramic plate may be formed in molding the ceramic plate or after molding or firing the ceramic plate. As shown in FIG. 1, the rims 5 of holes 1 formed in a ceramic plate A may be rounded or chamfered to avoid stress concentration on a particular portion of a bonding layer.

The term 'insertion' is used herein in its broad sense to denote perforating a ceramic tubular member through a hole of a ceramic plate so that the ceramic tubular member projects on both sides of the ceramic plate and inserting a ceramic tubular member in a hole of a ceramic plate so that one end of the ceramic tubular member is flush with one of the major surfaces of the ceramic plate.

The shape of ceramic tubular members employed in the present invention includes a tubular structure, a honeycomb structure and a double tube structure. These is no particular restriction on the diameter and length of the ceramic tubular members, and the cross section of the ceramic tubular members can be circular, elliptic, rectangular, polygonal or irregular, such as star-shaped. The ceramic tubular member can have either open opposite ends or one closed end. When the hole is tapered, stepped or internally threaded, the outer circumference of the ceramic tubular member is tapered, stepped or threaded accordingly as shown in FIGS. 5(a), (b) and (d) or flanged as shown in FIG. 10(b). When a ceramic sleeve is interposed between the hole and the ceramic tubular member, the ceramic sleeve is formed with an external shape conforming to the tapered, stepped or internally threaded hole as shown in FIGS. 6(a) to 6(d), and the outer circumference of the ceramic tubular member is formed in a shape conforming to the shape of the inner circumference of the ceramic sleeve as shown in FIG. 5(c).

It is preferable to determine selectively the diameter of the hole to receive the ceramic tubular member or the ceramic sleeve so that the ceramic tubular member or the ceramic sleeve can be inserted in the hole and a predetermined clearance is formed between the surface of the hole and the outer circumference of the ceramic tubular member or the ceramic sleeve when the ceramic tubular member or the ceramic sleeve is disposed coaxially with the hole. Furthermore, it is preferable that the clearance allows a fused bonding material to flow into the clearance to form a bonding layer in bonding the ceramic tube or the ceramic sleeve to the ceramic plate by spreading a paste of the bonding material over the surface of the ceramic plate and by heating the same.

When two ceramic plates, i.e., a first ceramic plate and a second ceramic plate, differing from each other in the diameter of holes formed therein are used in combination, the diameter of the holes of the first ceramic plate is determined, in a manner similar to that for determining the diameter of the holes of the single ceramic plate, so that the ceramic tubular member can be inserted in the hole and a bonding layer can be formed between the surface of the hole and the outer circumference of the ceramic tubular member as disposed substantially coaxially with the hole. On the other hand, holes are formed in the second ceramic plate with a diameter not smaller than the inside diameter of the ceramic tubular member and not larger than the outside diameter of the ceramic tubular member. Preferably, the hole of the second ceramic plate is formed in a diameter equal to the inside diameter of the ceramic tubular member to make the insertion of the ceramic tubular member in the hole impossible. For example, as shown in FIG. 9(c), a ceramic tubular member B is inserted in a hole formed in a first ceramic plate A so that its end 3 is flush with the surface 2 of the first ceramic plate A and contiguous with a surface 7 of a second ceramic plate D contiguous with the surface 2 of the first ceramic plate A, and the second ceramic plate D is bonded to the first ceramic plate A. It is also possible to employ a ceramic tubular member provided at least at its one end with a flange 8 as shown in FIG. 10(b), and a first ceramic plate provided with holes each provided with a counterbore having a shape conforming to the flange 8 at its one end opening in one surface of the first ceramic plate A' to be joined to a second ceramic plate D, to insert the ceramic tubular member B' in the hole so that the flange 8 is seated on the bottom surface of the counterbore with its end surface flush with the surface of the first ceramic plate A', and to bond the second ceramic plate to the surface of the first ceramic plate as shown in FIG. 10(c). This flanged ceramic tubular member can firmly be fastened to the first ceramic plate having a high sealing effect and can be disposed accurately on the first ceramic plate. There are no restrictions for the size of the flange or the like.

Preferably, the clearance between the outer circumference of the ceramic tubular member of the ceramic sleeve, and the surface of the corresponding hole is in the range of 0.05 to 0.5 mm. A clearance smaller than 0.05 mm will form a non-uniform bonding layer or will make hard the flow of the bonding material spread over the surface of the ceramic plate and fluidized by fusion into the clearance, and will deteriorate the sealing effect of the bonding material and the bonding strength of the bonding layer. A clearance larger than 0.5 mm would deteriorate the positional accuracy of the ceramic tubular member relative to the ceramic plate and make the thickness of the bonding layer irregular.

Figure 2:
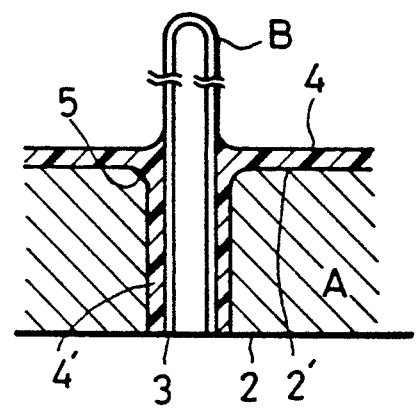
Figure 3A:
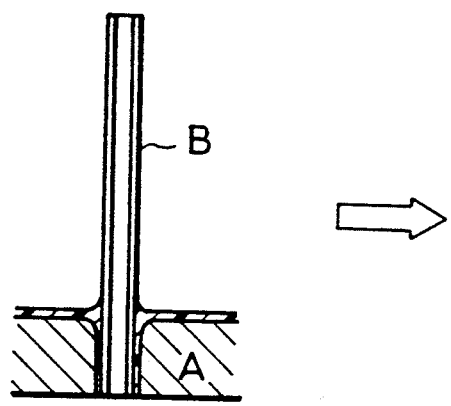
Figure 3B:
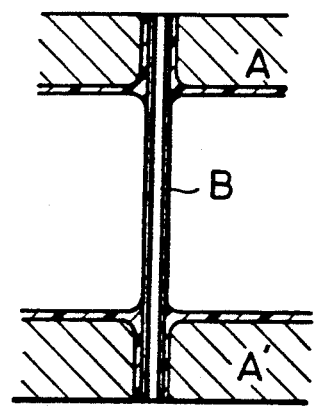

For example, in bonding a ceramic tubular member having one closed end as shown in FIG. 2 to a ceramic plate by spreading a bonding material on the surface of the ceramic plate, the ceramic tubular member may be inclined to the surface of the ceramic plate and may extend in an unsatisfactory positional accuracy, and thickness of the bonding layer may not be uniform if the clearance is larger than 0.5 mm. In forming a bonded ceramic structure as shown in FIG. 3(b) by inserting the opposite open ends of a ceramic tubular member B respectively in ceramic plates A and A', first one end of the ceramic tubular member B is bonded to the ceramic plate A as shown in FIG. 3(a), and then the other end of the ceramic tubular member B is bonded to the other ceramic plate A' as shown in FIG. 3(b). If the clearance is greater than 0.5 mm, the ceramic tubular member B will not be bonded to the ceramic plate A in a correct position, which will make the insertion of the other end of the ceramic tubular member B into the hole of the other ceramic plate A' difficult. In forming a bonded ceramic structure as shown in FIG. 4, the opposite open ends of a ceramic tubular member B are bonded simultaneously to ceramic plates A and A' supported with a jig E. However, a fused bonding material spreading in the vicinity of a portion F is liable to flow downward if the clearance is greater than 0.5 mm, which makes the bonding layer irregular and deteriorates the sealing effect and bonding strength of the bonding layer.

The present invention includes a bonded ceramic structure comprising a plurality of ceramic plates arranged at equal intervals parallel to each other, and a large number of ceramic tubular members extended across and bonded to the plurality of ceramic plates.

A suitable bonding material is chosen in consideration of the functional properties of ceramic materials forming the ceramic plates and the ceramic tubular members and the working conditions of the bonded ceramic structure. Generally, a ceramic material of the same kind as that forming the ceramic plate or the ceramic tubular member or an inorganic bonding material, which is fusible when heated such as $PbO-B_2O_3$ glass generally used for bonding a ceramic to a ceramic, is used for bonding the ceramic tubular member to the ceramic plate.

A method of constructing a bonded ceramic structure by bonding will be described hereinafter.

First a method of constructing a bonded ceramic structure not using ceramic sleeves, and comprising a ceramic plate provided with straight holes and straight ceramic tubular members will be described. A bonding paste prepared by kneading a mixture of the powder of a bonding material, a binder, if necessary, and a solvent, such as water or alcohol, is spread over at least one of the major surfaces of the ceramic plate; the ceramic tubular members are inserted in the holes of the ceramic plate and are held fixedly in a predetermined position relative to the ceramic plate; and the solvent is removed; and/or the bonding paste is fused by heating; and the fused bonding material is solidified by cooling in a bonding layer continuously spreading over the surface of the ceramic plate and the clearances as shown in FIGS. 2, 3(b) and 4 to bond the ceramic tubular members to the ceramic plate. When fused by heating, the bonding paste spread on the surface of the ceramic plate is fluidized and the fluidized bonding materials covers the surface of the ceramic plate entirely and fills up the clearances between the surfaces of the holes and the outer circumferences of the corresponding ceramic tubular members. Thus, the ceramic tubular members are bonded firmly to the ceramic plate by the bonding layer continuously spreading the entire surface of the ceramic plate and filling up the clearances between the surfaces of the holes and the outer circumferences of the corresponding ceramic tubular members. A fluid bonding slurry prepared by mixing an ordinary inorganic bonding material and a solvent, and capable of flowing into the clearances can be used for bonding the ceramic tubular members to the ceramic plate. The bonding material can be spread on the surface of the ceramic plate either before or after inserting the ceramic tubular members in the holes of the ceramic plate.

A preferable thickness of the bonding layer continuously spreading over the surface of the ceramic plate and in the clearances is in the range of about 0.2 to 2.5 mm. If a bonding layer having a thickness smaller than 0.2 mm is formed, such a thin layer of the bonding material is unable to form a fluid bonding material when fused. Therefore, a sufficient amount of the bonding material is unable to flow into the clearances and, consequently, the bonding layer is unable to seal the clearances satisfactorily. A bonding layer having a thickness larger than 2.5 mm is liable to crack after solidifying the fused bonding material by cooling, which deteriorates the thermal characteristics and sealing effect of the bonding layer. The thickness of the coat of the bonding material formed over the surface of the ceramic plate is dependent on the size of the ceramic plate, the pitches of the holes for receiving the ceramic tubular members, the size of the clearances between the ceramic plate and the ceramic tubular members, and the type, grain size and density of the bonding material, and hence the thickness is determined selectively taking into consideration bonding conditions so that a bonding layer of a desired thickness can be formed when the bonding material is fused by heating and the fluidized bonding material is solidified by cooling. Generally, a bonding paste is spread in a coat having a thickness in the range of about 0.5 to 5.5 mm.

The above-mentioned method can employ a wall to intercept the flow of the fused bonding material.

According to the present invention, the bonding material can be spread on both the major surfaces of the ceramic plate to form a bonding layer continuously extending over both the major surfaces of the ceramic plate and the clearances between the surfaces of the holes of the ceramic plate and the outer circumferences of the ceramic tubular members inserted in the holes of the ceramic plate to bond the ceramic tubular members to the ceramic plate. When each of the ceramic tubular members is inserted in the hole of the ceramic plate with its one end flush with one of the major surfaces of the ceramic plate, it is preferable to spread the bonding material on the other major surface of the ceramic plate from which the other end of each of the ceramic tubular members projects.

Figure 7A:
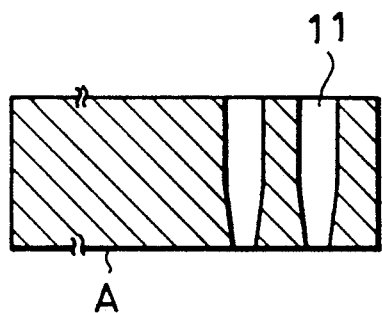
FIGS. 7(a) to 7(d) are sectional views of ceramic plates provided respectively with holes of different shapes, respectively for bonded ceramic structures in preferred embodiments according to the present invention.
Figure 7B:
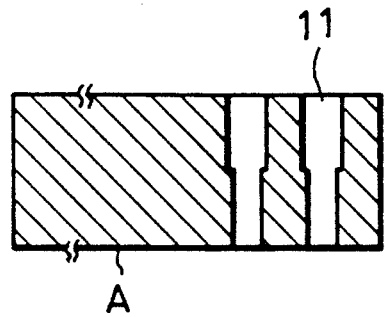
Figure 7C:
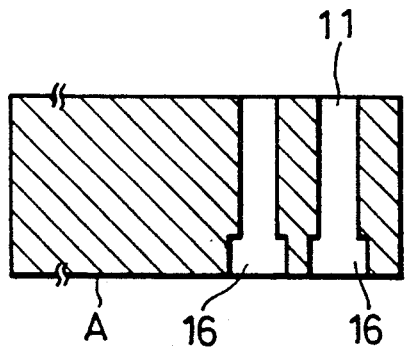
Figure 7D:
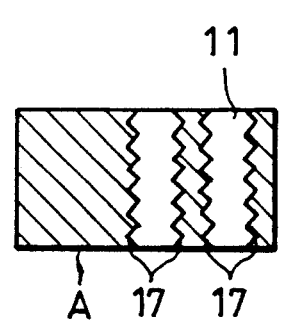
Figure 8A:
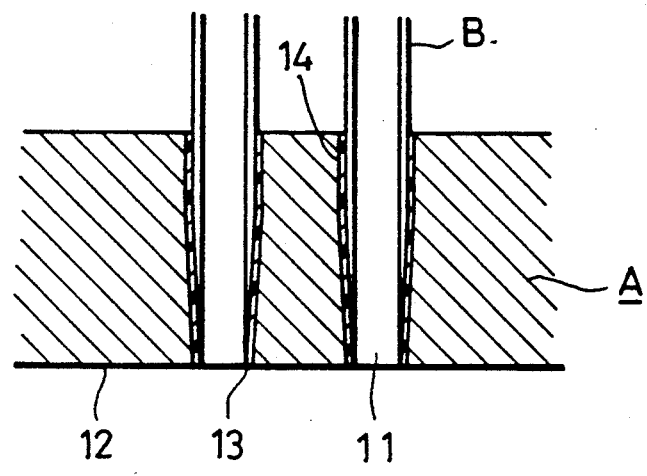
FIGS. 8(a), 8(b), 8(a'), 8(b'), 8(c), 8(d) and 8(d') are fragmentary sectional views of assemblies of the ceramic tubular members of FIGS. 5(a) to 5(e) and 6(a) to 6(d) and the corresponding ceramic plates of FIG. 7(a) to 7(d)
Figure 8B:
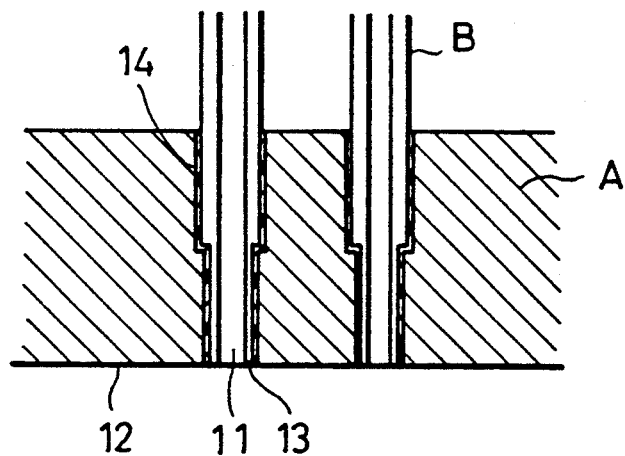
Figure 8D:
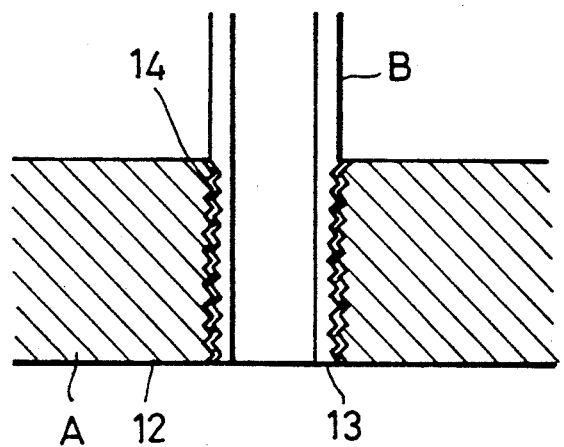
Figure 8D:
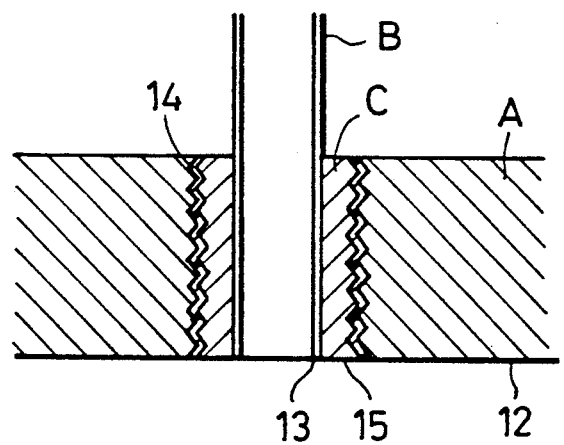

In constructing a bonded ceramic structure such as shown in FIGS. 8(a), 8(b) or 8(d) by combining a ceramic tubular member as shown in FIGS. 5(a) (tapered end), 5(b) (stepped end) or 5(d) (externally threaded end), and a ceramic plate as shown in FIGS. 7(a), 7(b) or 7(d) having holes of a shape conforming to that of the mating end of the corresponding ceramic tubular member, a bonding material is spread on the surface of the hole and/or the circumference of the ceramic tubular member, and then the ceramic tubular member is inserted in or screwed in the hole of the ceramic plate so that the ceramic tubular member is placed at a desired position. The bonding material forms a bonding layer in the clearance between the surface of the hole and the circumference of the ceramic tubular member to bond the ceramic tubular member to the ceramic plate. The bonding material can be spread over one of or both the major surfaces of the ceramic plate to form a bonding layer continuously extending over the major surface or both the major surfaces, and the clearance.

Figure 6A:
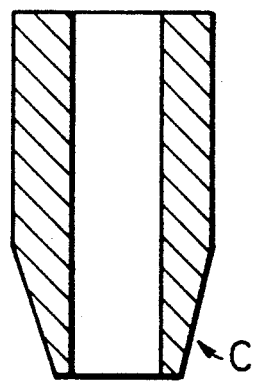
FIGS. 6(a) to 6(d) are sectional views of ceramic sleeves respectively for bonded ceramic structures in preferred embodiments according to the present invention.
Figure 6B:
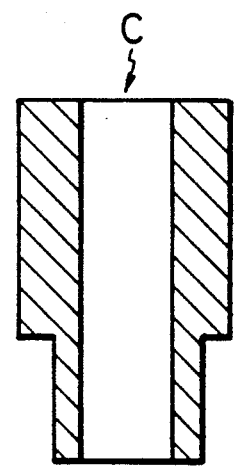
Figure 6C:
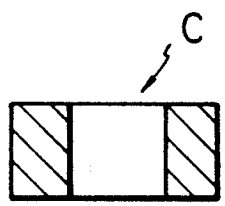

In constructing a bonded ceramic structure as shown in FIGS. 8(a'), (b'), (c) or (d') by combining a ceramic tubular member as shown in FIG. 5(c), a ceramic sleeve as shown in FIGS. 6(a), 6(b), 6(c) or (d), and a ceramic plate as shown in FIGS. 7(a), 7(b), 7(c) or (d), the ceramic sleeve is fitted over the end of the ceramic tubular member, the assembly of the ceramic sleeve and the ceramic tubular member is fired to join together the ceramic sleeve and the ceramic tubular member, a bonding material is spread on the outer circumference of the ceramic sleeve and the surface of the hole, and then the ceramic tubular member combined with the sleeve is bonded to the ceramic plate.

In constructing a bonded ceramic structure employing two ceramic plates in combination, a bonding slurry or a bonding paste prepared by mixing powder of a bonding material and a solvent is spread over the surface of the hole of a first ceramic plate and/or the outer circumference of a portion of the ceramic tubular member to be fitted in the hole, the ceramic tubular member is inserted in the hole so that the end of the same is flush with the outer surface of the first ceramic plate; the solvent is evaporated; if necessary, the bonding material is fused by heating and then the fused bonding material is solidified by cooling to form a bonding layer in the clearance between the first ceramic plate and the ceramic tubular member. Subsequently, the bonding slurry or the bonding paste is spread over one major surface of a second ceramic plate; the second ceramic plate is joined to the outer surface of the first ceramic plate with each of the holes of the second ceramic plate coaxial with each of the holes of the first ceramic plate; the solvent is evaporated; if necessary, the bonding material is fused by heating, and then the fused bonding material is solidified by cooling to form a bonding layer between the first and second ceramic plates at right angles to the bonding layer in the clearance between the first ceramic plate and the ceramic tubular member. Thus, a bonding layer continuously extending between the first and second ceramic plates and in the clearances between the ceramic tubular members and the first ceramic plate is formed.

The bonding layer formed in the clearance between the first ceramic plate and the ceramic tubular member can be formed by spreading the bonding material only over the surface of the first ceramic plate and fusing the bonding material so that the fused bonding material flows into the clearance. The ceramic tubular member and the second ceramic plate may be bonded simultaneously to the first ceramic plate. In the case of employing a ceramic tubular member provided at its end with a flange, a bonding layer can be formed in the clearance by the same procedure except that the flange is bonded to its counterbore having a shape conforming to the shape of the flange. Also, a bonded structure can be formed where both ceramic tubular members each having a straight end and those each having a flanged end are bonded to a single ceramic plate.

As is apparent from the foregoing description, a bonded ceramic structure in accordance with the present invention constructed by inserting ceramic tubular members respectively in a plurality of holes formed in a ceramic plate and bonding the ceramic tubular members to the ceramic plate has uniform joints with no defects, and has an improved fluid-tight construction and excellent resistance to thermal shocks and thermal stress. Accordingly, the bonded ceramic structure is effectively applicable to a heat exchanger for a gas turbine as well as to a heat exchanger for an industrial furnace.

EXAMPLES

Preferred embodiments of the present invention will be described hereinafter referring to the accompanying drawings; however, the present invention is not restricted within these Examples.

EXAMPLES 1 TO 6

Six perforated ceramic plates A as shown in FIG. 1 of 700×700×100 mm in size each provided with sixty-four holes 1 arranged at a pitch of 80 mm with their axes perpendicular to one major surface 2' of the perforated ceramic plate A were produced by compression-molding fine powder of silicon nitride containing a sintering assistant; molded; and fired at 1700° C. for one hour.

Sixty-four ceramic tubular members B having the shape of a circular tube of 50 mm in outside diameter, 40 mm in inside diameter and 1000 mm in length each having one bottomed end were produced by extruding the same material as that forming the ceramic plate A in moldings and firing the moldings at 1700° C. for one hour.

The rim of one end of each hole 1 was chamfered in a chamfer of 1 mm×45°. The diameter of the holes 1 of each perforated ceramic plate A was determined so as to form a clearance shown in Table 1 between the surface of each hole 1 and the outer circumference of the ceramic tubular member B.

Then, as shown in FIG. 2, a bonding paste prepared by mixing 100 parts by weight crushed Pyrex ® (80.5 wt % $SiO_2$, 12.9 wt % $B_2O_3$, 3.8 wt % $Na_2O$, 0.4 wt % $K_2O$, and 2.2 wt % $Al_2O_3$), 2 parts by weight binder and 40 parts by weight water was spread over the surface 2' of each perforated ceramic plate A in a coat of a thickness shown in Table 1. Then, the ceramic tubular members B were inserted respectively in the holes 1 of each perforated ceramic plate A so that the open end of each ceramic tubular member B is flush with the other major surface 2 of the perforated ceramic plate A. Clearance of a size shown in Table 1 was formed between the surface of the hole 1 and the outer circumference of the ceramic tubular member B.

Then, each assembly of the perforated ceramic plate A and the ceramic tubular members B was dried at 110° C. for three hours, the dried assembly was fired at 1200° C. for one hour in the atmosphere, and then the fired assembly was cooled naturally to room temperature to obtain a bonded ceramic structure. The thickness of the bonding layer, and the positional accuracy of the ceramic tubular members were measured, and the conditions of the surface bonding layer 4 and the bonding layer 4' formed in the clearance were observed.

The results are shown in Table 1.

COMPARATIVE EXAMPLES 1 to 4

Perforated ceramic plates A for bonded ceramic structures as Comparative examples 1 to 4 were produced by the same procedure as that employed in producing the perforated ceramic plate of Example 1, and ceramic tubular members B were produced by the same procedure as that employed in manufacturing the ceramic tubular members B of Example 1. The diameter of the holes 1 of each perforated ceramic plate A was determined so as to form a clearance shown in Table 1 between the surface of the hole 1 and the outer circumference of the ceramic tubular member B.

The same bonding paste as that used in producing Example 1 was spread over one major surface 2' of each perforated ceramic plate A in a coat of a thickness shown in Table 1, and then the ceramic tubular members B were inserted in the holes 1 of the perforated ceramic plates A and bonded to the perforated ceramic plate A. The assemblies of the perforated ceramic plates and the ceramic tubular members B were dried and fired by the same process as that applied to manufacturing Example 1 to obtain bonded ceramic structures as Comparative examples 1 to 4.

The results are shown in Table 1.

The data of Examples 1 to 6 proved that when the bonding layer is formed so as to extend continuously over the surface of the perforated ceramic plates A and in the clearance between the surface of each holes 1 and the outer circumference of the ceramic tubular member B inserted in the hole 1, the clearances can be comparatively small to form comparatively thin bonding layers; uniform bonding layers free from defects, such as cracks, can be formed; and such a uniform, comparatively thin bonding layer improves the positional accuracy of the ceramic tubular members B.

TABLE 1

| | Thickness of bonding coat (mm) | Clearance (mm) | Thickness of bonding layer on the surface (mm) | Positional accuracy of ceramic tubular members | Condition of bonding layer | |
|---|---|---|---|---|---|---|
| | | | | | Surface | Clearance |
| Example 1 | 0.5 | 0.10 | 0.2 | High | Uniform Defectless | Bonding layer is formed in the clearance by a depth of several tens millimeters. |
| Example 2 | 1.0 | 0.10 | 0.2 | High | Uniform Defectless | Bonding layer is formed entirely in the clearance. |
| Example 3 | 2.6 | 0.10 | 1.0 | High | Uniform Defectless | Bonding layer is formed entirely in the clearance. |
| Example 4 | 5.0 | 0.10 | 2.2 | High | Uniform Minutely fissured | Bonding layer is formed entirely in the clearance. |
| Example 5 | 2.3 | 0.05 | 1.0 | Very high | Uniform Defectless | Bonding layer is formed entirely in the clearance. |
| Example 6 | 4.8 | 0.50 | 1.0 | Slightly inclined | Uniform Defectless | Bonding layer is formed entirely in the clearance. |
| Comparative Example 1 | 0.2 | 0.10 | 0.1 | High | Irregular (Non-uniform) | No bonding layer is formed. |
| Comparative Example 2 | 6.0 | 0.10 | 2.8 | High | Uniform fissured | Bonding layer is formed entirely in the clearance. |
| Comparative Example 3 | 2.1 | 0.01 | 1.0 | Very high | Uniform Defectless | Irregular bonding layer is formed. (Non-uniform bonding layer is formed.) |
| Comparative Example 4 | 7.7 | 1.00 | 1.0 | Greatly inclined and interfering | Uniform Defectless | Bonding layer is formed entirely in the clearance. |

EXAMPLE 7

A perforated ceramic plate A similar to that of Example 1 was produced by the same procedure as that applied to producing Example 1, except that the perforated ceramic plate A of Example 7 is provided with holes 11 arranged at a pitch of 75 mm and the rims of the holes 11 are not chamfered. As shown in FIG. 7(a), each hole 11 has a cylindrical portion of 50.2 mm in diameter and 40 mm in depth from one surface of the ceramic plate A through which a ceramic tubular member is inserted in the hole 11, and a tapered portion of 60 mm in length extending from the inner end of the cylindrical portion to the other surface of the same and having a larger end of 50.2 mm in diameter and a smaller end of 40.2 mm in diameter.

Ceramic tubular members B of a circular cross section having an outside diameter of 50 mm, an inside diameter of 40 mm and a length of 1000 mm were produced by the same process as that employed in producing the ceramic tubular members B of Example 1. As shown in FIG. 5(a), one end of each ceramic tubular member B is tapered to form a tapered portion of 60 mm in length having a larger end of 50 mm in outside diameter, a smaller end of 40 mm in outside diameter and a shape conforming to the tapered portion of the hole 11.

As shown in FIG. 8(a), bonding slurry prepared by mixing 100 parts by weight crushed $PbO\text{-}B_2O_3$ glass, 2 parts by weight binder and 40 parts by weight water was spread on the surface of each hole 11 of the ceramic plate A in a bonding layer 14, and then the ceramic tubular members B were inserted respectively in the holes 11 so that the end of each ceramic tubular member B was flush with the other surface 12 of the perforated ceramic plate A.

The assembly of the perforated ceramic plate A and the ceramic tubular members B was fired in an atmosphere of nitrogen gas, and the fired assembly was cooled naturally to the room temperature to obtain a bonded ceramic structure 30.

Figure 13:
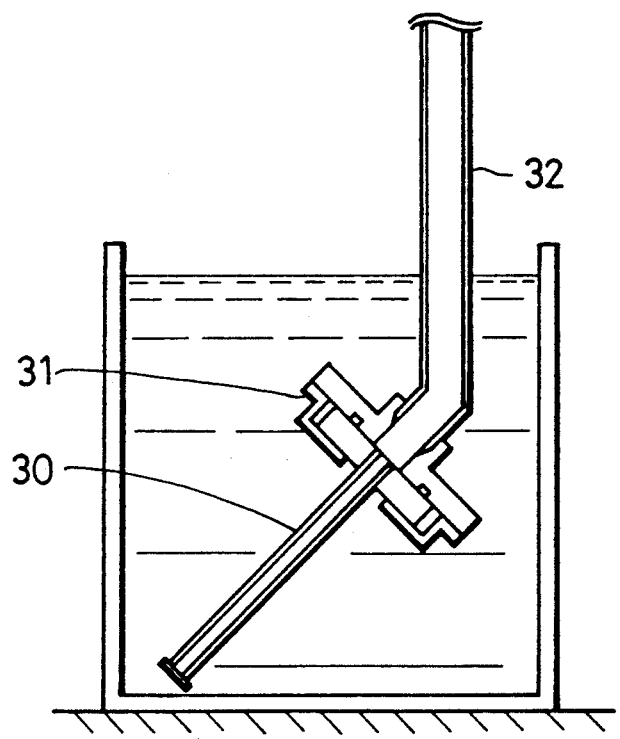
FIG. 13 is a sectional view of a leakage tester used for testing the fluid-tightness of bonded ceramic structures embodying the present invention.

The fluid-tightness of the bonded ceramic structure 30 was tested by a leakage tester shown in FIG. 13. In the leakage test, the bonded ceramic structure 30 set on a jig 31 was immersed in water, and then a pressure of 8 kg/cm$^2$ was applied to the interiors of the ceramic structure 30 through a pipe 32. No bubbles formed in the water. The fluid-tightness of the bonded ceramic structure was satisfactory.

The bonded ceramic structure was subjected to a cantilever bending strength test. The strength was as high as 208 MPa.

EXAMPLE 8

A bonded ceramic structure as Example 8 is identical with the bonded ceramic structure of Example 7, except that the bonded ceramic structure as Example 8 has perforated ceramic plate A provided with stepped holes, and ceramic tubular members B each having a stepped end conforming to the stepped hole.

As shown in FIG. 7(b), each hole 11 of the perforated ceramic plate A has a larger portion of 50.1 mm in diameter and 40 mm in length from one surface of the perforated ceramic plate A through which the ceramic tubular member B is inserted in the hole 11, and a smaller portion of 45.1 mm in diameter and 60 mm in length extending from the inner end of the larger portion to the other surface of the perforated ceramic plate A. The ceramic tubular member B of 50 mm in outside diameter and 40 mm in inside diameter is identical with that of Example 7, except that the ceramic tubular member B of Example 8 has a stepped end portion of 60 mm in length and 45 mm in outside diameter having a stepped external shape conforming to the stepped hole 11 as shown in FIG. 5(b).

The ceramic tubular members B were bonded to the perforated ceramic plate A by the same procedure as that employed in forming the bonded ceramic structure as Example 7 to fabricate a bonded ceramic structure as shown in FIG. 8(b).

The fluid-tightness of the bonded ceramic structure was tested in the same manner as that employed in testing the bonded ceramic structure was Example 7.

No bubbles formed in the water, which proved the satisfactory fluid-tightness of the bonded ceramic structure.

The bonded ceramic structure was subjected to the same cantilever bending strength test as that applied to testing the bonded ceramic structure as Example 7. The strength was as high as 190 MPa.

COMPARATIVE EXAMPLE 5

A conventional bonded ceramic structure as a comparative example will be described hereinafter.

A perforated ceramic plate A is produced by the same procedure as that employed of Example 7, except that the perforated ceramic plate A is provided with holes 11 of 50.1 mm in diameter. Straight ceramic tubular members B of 50 mm in outside diameter, 40 mm in inside diameter and 1000 mm in length were produced as shown in FIG. 5(c) by the same procedure as that of Example 7.

Figure 11:
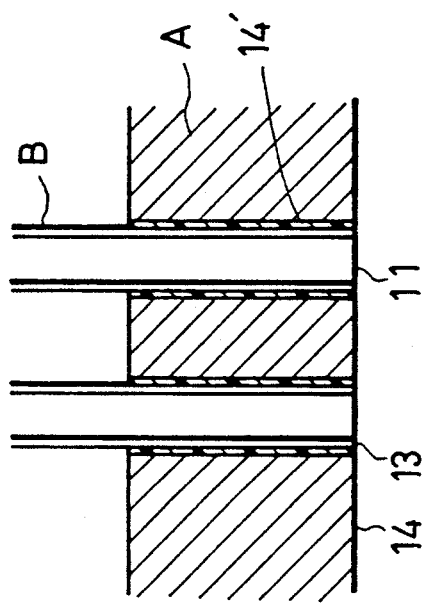
FIG. 11 is a fragmentary sectional view of a conventional bonded ceramic structure.
Figure 12:
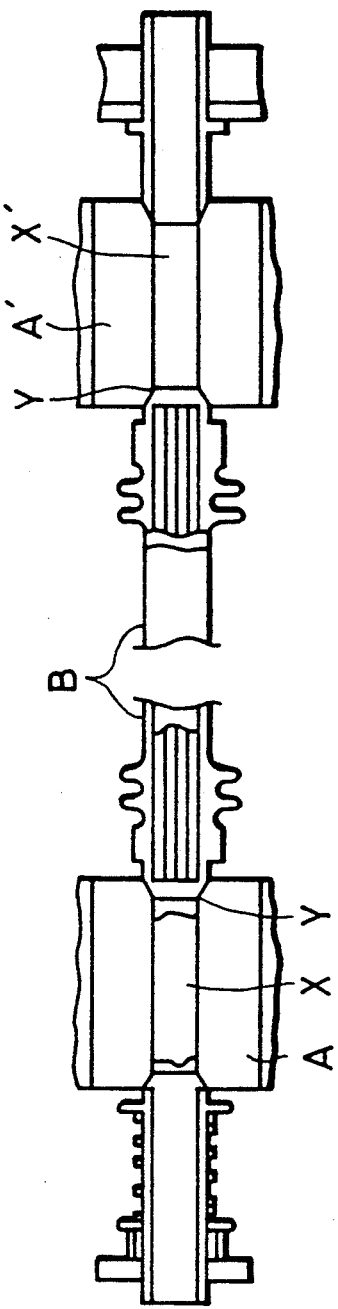
FIG. 12 is a fragmentary sectional view of the bonding part of a conventional shell-and-tube heat exchanger.

The same bonding slurry used for fabricating the bonded ceramic structure as Example 7 was spread on the circumference of one end portion of each ceramic tubular member B to be received in the hole 11 of the perforated ceramic plate A to form a bonding layer 14' (FIG. 11), and then the ceramic tubular members B were inserted respectively in the holes of the perforated ceramic plate A so that the end 13 of each ceramic tubular member B is flush with the surface 14 of the perforated ceramic plate A.

The assembly of the perforated ceramic plate A and the ceramic tubular members B was fired in the same manner as that employed in producing Example 7 to obtain a bonded ceramic structure. The fluid-tightness of the bonded ceramic structure was tested by the leakage tester shown in FIG. 13 in the same manner as that employed in testing Example 7. Bubbles formed and the fluid-tightness of the bonded ceramic structure was unsatisfactory.

The bonding strength of the bonded ceramic structure was measured by the same method as that employed for testing Example 7. The strength was as low as 110 MPa.

As is obvious from the results of evaluation of Example 7 and 8, a bonded ceramic structure comprising a perforated ceramic plate provided with tapered holes, and ceramic tubular members each having a tapered end of a shape conforming to the tapered hole, and a bonded ceramic structure comprising a perforated ceramic plate provided with stepped holes, and ceramic tubular members each having a stepped end portion of a shape conforming to the stepped hole have excellent fluid tightness and a high bonding strength.

EXAMPLE 9

A perforated ceramic plate A was produced by the same process as that employed in producing the perforated ceramic plate of Example 7. The perforated ceramic plate A was provided with holes 11 each consisting of a cylindrical portion of 52.1 mm in diameter and 50 mm in length from one surface of the perforated ceramic plate A through which a ceramic sleeve and a ceramic tubular member are inserted in the hole 11, and a tapered portion of 50 mm in length extending from the inner end of the cylindrical portion to the other surface of the perforated ceramic plate A and having a larger end of 52.1 mm in diameter and a smaller end of 50.1 mm in diameter.

Ceramic tubular members B of 50 mm in outside diameter, 40 mm in inside diameter and 1000 mm in length having the shape of a round pipe such as shown in FIG. 5(c) were formed of fine powder, the same material (silicon nitride 1) as that forming the perforated ceramic plate A.

Ceramic sleeves C, similar to a ceramic sleeve shown in FIG. 6(a), of 100 mm in length and 50 mm in inside diameter were produced. Each ceramic sleeve C has cylindrical portion of 52 mm in outside diameter and 50 mm in length, and a tapered portion of 50 mm in length having a larger end of 52 mm in outside diameter, a smaller end of 50 mm in outside diameter and a shape conforming to the tapered portion of the hole 11.

Each ceramic sleeve C was fitted over the ceramic tubular member B, and the assembly of the ceramic sleeve C and the ceramic tubular member B was fired to join the ceramic sleeve C and the ceramic tubular member B.

As shown in FIG. 8(a'), the bonding slurry, used in producing the bonded ceramic structure as Example 7 was spread on the surface of the holes 11 of the perforated ceramic plate A to form a bonding layer 14, and then the ceramic sleeve C joined to one end of each ceramic tubular member B was inserted in the hole 11 so that the respective ends 13 and 15 of the ceramic tubular member B and the ceramic sleeve C are flush with the other surface 12 of the perforated ceramic plate A.

Then, the assembly of the perforated ceramic plate A, the ceramic tubular member B and the ceramic sleeve C was fired similarly to that of Example 7 in an atmosphere of nitrogen gas and was cooled to room temperature to complete a bonded ceramic structure. The bonded ceramic structure thus produced was subjected, similarly to Example 7, to a leakage test to test its fluid-tightness. No bubbles formed and the fluid-tightness of the bonded ceramic structure was satisfactory.

The bonded ceramic structure was subjected to the same cantilever bending strength test as that applied to Example 7. The strength of the bonded ceramic structure was as high as 200 MPa. The bonded ceramic structure was subjected to a fatigue test, in which a load of 100 MPa was exerted repeatedly on the bonded ceramic structure as a frequency of 10 Hz for 1000 hours. The bonded ceramic structure withstood the fatigue test.

The data of Example 9 and the test results are shown in Table 2.

TABLE 2

| | Material | | | Design | | Test Results | | | | |
|---|---|---|---|---|---|---|---|---|---|---|
| | Ceramic tubular member | Perforated ceramic plate | Ceramic sleeve | Shape of ceramic sleeve | Clearance (mm) | Fluid-tightness | Bonding strength | Heat cycle test | Fatigue strength | Positional accuracy |
| Example 9 | $Si_3N_4$① | $Si_3N_4$① | $Si_3N_4$① | Tapered | 0.05 | Perfect | 200 MPa | — | 1000 hrs or above | Satisfactory |
| Example 10 | $Si_3N_4$① | $Si_3N_4$① | $Si_3N_4$① | Stepped | 0.1 | Perfect | 230 MPa | — | 1000 hrs or above | Satisfactory |
| Example 11 | $Si_3N_4$① | $Si_3N_4$① | $Si_3N_4$① | Collar | 0.2 | Perfect | 190 MPa | — | 1000 hrs or above | Satisfactory |
| Example 12 | $Si_3N_4$②* | $Si_3N_4$① | $Si_3N_4$③* | Tapered | 0.05 | Perfect | 220 MPa | 1000 hrs | 1000 hrs | Satisfactory |

TABLE 2-continued

| | Material | | | Design | | Test Results | | | |
|---|---|---|---|---|---|---|---|---|---|
| | Ceramic tubular member | Perforated ceramic plate | Ceramic sleeve | Shape of ceramic sleeve | Clearance (mm) | Fluid-tightness | Bonding strength | Heat cycle test | Fatigue strength | Positional accuracy |
| Comparative Example 6 | $Si_3N_4$① | $Si_3N_4$① | — | — | 0.1 | Leakage | 100 MPa | or above — | or above Fraction of tubular in 200 hrs | Inclined |

*Expansion coefficient (1/°C.) of $Si_3N_4$③ = [Expansion coefficient (1/°C.) of $Si_3N_4$① + Expansion coefficient (1/°C.) of $Si_3N_4$②]/2

EXAMPLE 10

A bonded ceramic structure as Example 10 is identical with that as Example 9, except that Example 10 employs a perforated ceramic plate A provided with stepped holes 11, and ceramic sleeves C having an external shape conforming to the shape of the stepped holes 11 of the perforated ceramic plate A.

Each stepped hole 11 of the perforated ceramic plate A has a larger portion of 50.2 mm in diameter and 50 mm in length from one surface of the perforated ceramic plate through which the ceramic sleeve C is inserted in the stepped hole 11, and a smaller portion of 45.2 mm in diameter and 50 mm in length as shown in FIG. 7(b). As shown in FIG. 6(b), the ceramic sleeve C has an inside diameter of 40 mm and has an external shape conforming to the shape of the stepped hole 11 and consisting of a larger portion of 50 mm in outside diameter and 500 mm in length, and a smaller portion of 45 mm in outside diameter and 50 mm in length.

The thus obtained bonded ceramic structure shown in FIG. 8(b) was subjected to the same leakage test as that applied to Example 7. No bubbles formed and the fluid-tightness was satisfactory. The bonded ceramic structure was subjected also to the same cantilever bending strength test as that applied to testing Example 7. The strength was as high as 230 MPa. The bonded ceramic structure withstood a fatigue test, in which a load of 100 MPa was exerted repeatedly on the bonded ceramic structure at a frequency of 10 Hz for 1000 hours.

The data of Example 10 and the test results are shown in Table 2.

EXAMPLE 11

A bonded ceramic structure as Example 11 is identical with the bonded ceramic structure as Example 9, except that Example 11 employs a perforated ceramic plate A provided with holes 11 each having a counterbore 16, a kind of stepped form thereof.

As shown in FIG. 7(c), each hole 11 of the perforated ceramic plate A has a portion of 50.4 mm in diameter and 80 mm in length from one surface of the perforated ceramic plate A through which a ceramic tubular member B and a ceramic sleeve C are inserted in the hole 11, and a counterbore 16 of 60.4 mm in diameter and 20 mm in length formed in the other surface of the perforated ceramic plate A. As shown in FIG. 6(c), the ceramic sleeve C has an outside diameter of 60 mm, an inside diameter of 50 mm and a length (thickness) of 20 mm. The ceramic sleeve C fits the counterbore 16.

The bonded ceramic structure formed in a shape as shown in FIG. 8(c) was subjected to the same leakage test as that applied to testing Example 7. No bubbles formed and the fluid-tightness was satisfactory. The bonded ceramic structure was subjected also to a cantilever bending strength test. The strength was as high as 190 MPa. The bonded ceramic structure withstood a fatigue test, in which a load of 100 MPa was exerted repeatedly on the bonded ceramic structure at a frequency of 10 Hz for 1000 hours.

The data of Example 11 and the test results are shown in Table 2.

EXAMPLE 12

A bonded ceramic structure as Example 12 is similar to Example 9, except that the bonded ceramic structure as Example 12 employs a perforated ceramic plate A formed of silicon nitride ① used in Example 9 and ceramic tubular members B formed of silicon nitride ② having a different coefficient of thermal expansion from that of silicon tride ①, and ceramic sleeves C formed of silicon nitride ③ having a coefficient of thermal expansion between those of the silicon nitride ① and silicon nitride ② respectively forming the perforated ceramic plate A and the ceramic tubular members B. The perforated ceramic plate A, the ceramic tubular members B and the sleeves C were bonded together by the same process as that used for producing Example 9 to obtain the bonded ceramic structure as shown in FIG. 8(a'). The bonded ceramic structure was subjected to the same leakage test as that applied to Example 9. No bubbles formed and the fluid-tightness was satisfactory.

The bonded ceramic structure was subjected also to a cantilever bending strength test. The strength was as high as 220 MPa. The bonded ceramic structure withstood a fatigue test, in which a load of 100 MPa was exerted repeatedly on the bonded ceramic structure at a frequency of 10 Hz for 1000 hours. The bonded ceramic structure withstood a heat cycle test, in which the bonded ceramic structure was heated an cooled cyclically between the room temperature and 800° C. for 1000 hours.

The data of example 12 and the rest results are shown in Table 2.

COMPARATIVE EXAMPLE 6

A bonded ceramic structure as Comparative example 6 is identical with that as Comparative example 5, except that that bonded ceramic structure as Comparative example 6 employs a perforated ceramic plate provided with holes 11 of 50.2 mm in diameter.

The bonded ceramic structure was subjected to the same leakage test as that applied to Example 9. Bubbles formed and the fluid-tightness was unsatisfactory.

The strength of the bonded ceramic structure determined by a cantilever bending strength test was as low as 100 MPa. The ceramic tubular members were broken when a load of 100 MPa was exerted repeatedly on the bonded ceramic structure as a frequency of 10 Hz for 200 hours for fatigue test.

The data of Comparative example 6 and the test results are shown in Table 2.

As is obvious from the test of Examples 9 to 12, the bonded ceramic structures each comprising a perforated ceramic plate, ceramic sleeves inserted in the holes of the perforated ceramic plate, and ceramic tubular members inserted in the ceramic sleeves have excellent fluid-tightness and high strength, and the indirect bonding of the ceramic tubular members through ceramic sleeves to the perforated ceramic plate relieves the stress induced in the bonded ceramic structure; and thus the jointed structures will be durable.

EXAMPLE 13

A perforated ceramic plate A provided with holes 11 each provided with an internal thread 17 as shown in FIG. 7(d) was produced by a material and a process similar to those employed in producing the perforated ceramic plate of example 7.

Ceramic tubular members B of 50 mm in outside diameter, 40 mm in inside diameter and 1000 mm in length having one threaded end as shown in FIG. 5(d) were formed of the same material as that of the perforated ceramic plate A. Each ceramic tubular member B was provided with a thread 18 in the outer circumference of the end 13 in a length of 100 mm mating with the internal thread 17.

The same bonding slurry as that used in Example 7 was spread on the surface of the holes 11 of the perforated ceramic plate A in a bonding layer 14, and then the ceramic tubular members B were screwed in the hole 11 so that the end 13 of each ceramic tubular member B was flush with the outer surface 12 of the perforated ceramic plate A as shown in FIG. 8(d).

The assembly of the perforated ceramic plate A and the ceramic tubular members B was fired in an atmosphere of nitrogen gas, and then the fired assembly was cooled naturally to room temperature to complete a bonded ceramic structure.

The bonded ceramic structure was subjected to the same leakage test as that applied to testing Example 7. No bubbles formed and the fluid-tightness was satisfactory.

The bonded ceramic structure was subjected to the same cantilever bending strength test as that applied to Example 7. The strength was as high as 250 MPa. The inclination of the ceramic tubular members towards the perforated ceramic plate was very small and the positional accuracy of the same was satisfactory.

EXAMPLE 14

A perforated ceramic plate A of 700 mm×700 mm×100 mm provided with holes 11 of 60 mm in diameter each provided with an internal thread and arranged at a pitch of 75 mm was produced by molding fine powder of silicon nitride containing sintering assistant in a molding and firing the molding by the same process as that employed in producing Example 7.

Ceramic tubular members B as shown in FIG. 5(c) of 50 mm in outside diameter, 40 mm in inside diameter and 1000 mm in length were formed of the same material as that forming the perforated ceramic plate A.

Figure 6D:
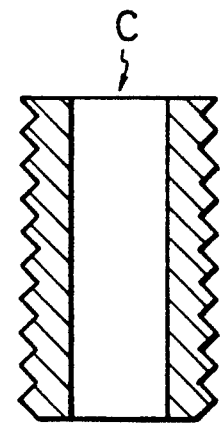

Ceramic sleeves C as shown in FIG. 6(d) of 60 mm in outside diameter, 50 mm in inside diameter and 100 mm in length each provided in its outer circumference with an external thread 18' mating with the internal thread 17 of the hole 11 of the perforated ceramic plate A were produced.

The ceramic sleeves C were fitted over the ceramic tubular members B, and then the assemblies of the ceramic sleeves C and the tubular ceramic members B were fired to join the ceramic sleeves C and the ceramic tubular members B.

After spreading the same bonding slurry as that used in Example 7 on the surface of the holes 11 of the perforated ceramic plate A in a bonding layer 14 as shown in FIG. 8(d'), the ceramic sleeves C joined to the ceramic tubular members B were screwed in the holes 11 so that the respective ends 13 and 15 of the ceramic tubular members B and the ceramic sleeves C are flush with the outer surface 12 of the perforated ceramic plate A.

The assembly of the perforated ceramic plate A, the ceramic tubular members B and the ceramic sleeve C were fired in an atmosphere of nitrogen gas to complete a bonded ceramic structure.

The bonded ceramic structure was subjected to the same leakage test as that applied to Example 7. No bubbles formed and the fluid-tightness was satisfactory.

The bonded ceramic structure was subjected also to a cantilever bending strength test. The strength was as high as 230 MPa. The inclination of the ceramic tubular members B towards the perforated ceramic plate A was very small and the positional accuracy of the same was satisfactory. The bonded ceramic structure withstood a fatigue test, in which a load of 100 MPa was exerted repeatedly on the bonded ceramic structure at a frequency of 10 Hz for 1000 hours.

As is obvious from the tests of Examples 13 and 14, the screwed joint has satisfactory sealing effect, improves bonding strength and enables the plurality of ceramic tubular members arranged in the same direction by length to be bonded to the perforated ceramic plate at a high positional accuracy.

EXAMPLE 15

Figure 9A:
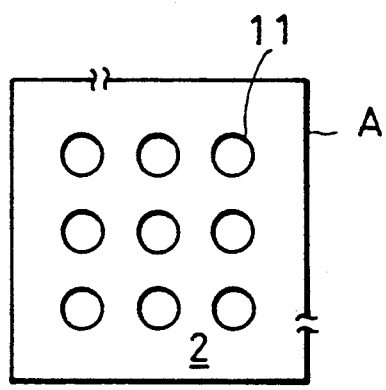
FIGS. 9(a) and 9(b) are plane views of two ceramic plates provided with holes to be used in combination for forming a bonded ceramic structure in a preferred embodiment according to the present invention.
Figure 9B:
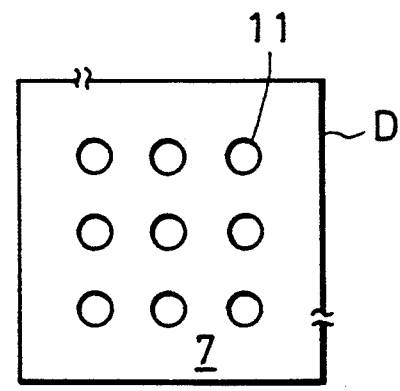
Figure 9C:
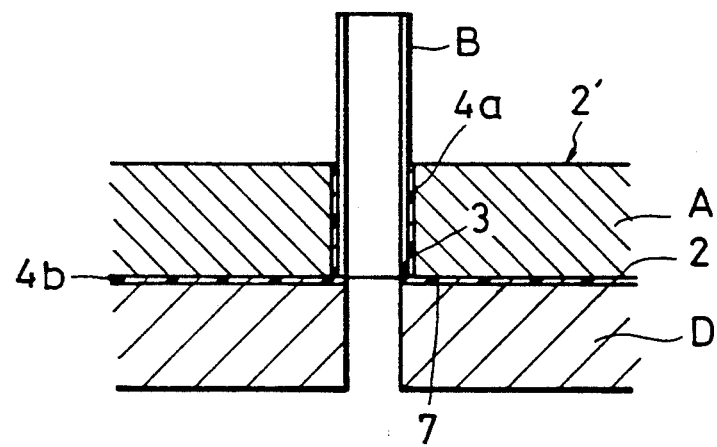
FIG. 9(c) is fragmentary sectional view of a bonded ceramic structure employing the ceramic plates of FIG. 9(a) and 9(b)

A first perforated ceramic plate A as shown in FIG. 9(a) of 700 mm×100 mm provided with holes 11 of 50.1 mm in diameter arranged at a pitch of 75 mm was formed by the same process as that applied in Example 7. A second perforated ceramic plate D as shown in FIG. 9(b) identical with the first perforated ceramic plate A, except that holes 11' formed in the second perforated ceramic plate D is 40 mm in diameter, was formed likewise.

Ceramic tubular members B as shown in FIG. 5(c) of 50 mm in outside diameter, 40 mm in inside diameter and 1000 mm in length having a circular cross section were formed by the same process as that applied to forming the ceramic tubular members of Example 9.

Then, as shown in FIG. 9(c), the same bonding paste as that used in Example 1 was spread in a coat of about 0.05 mm in thickness on the surfaces of the holes 11 of the perforated ceramic plate A, the bonding paste was spread on the outer circumference of one end portion of 100 mm in length of each ceramic tubular member B mating with the thickness of the ceramic plate A; the end portions of the ceramic tubular members B coated with the bonding paste were inserted respectively in the holes 11 of the first perforated ceramic plate A so that the ends 3 of the ceramic tubular members B are flush with the outer surface 2 of the first perforated ceramic plate A. Then, the assembly of the first perforated ceramic plate A and the ceramic tubular members B bonded to the first perforated ceramic plate A by the bonding layers 4a was fired in an atmosphere of nitrogen gas to obtain a bonded subassembly. The bonding paste was spread over the surface 7 of the second perforated ceramic plate D in a coat of about 0.1 mm in thickness, and then the second perforated ceramic plate D was joined to the surface 2 of the first perforated ceramic plate A so that the holes 11' of the second perforated ceramic plate D are coaxial respectively with the holes 11 of the first perforated ceramic plate A, the assembly of the bonded semiassembly and the second perforated ceramic plate D was fired in an atmosphere of nitrogen gas, and then the fired assembly was cooled naturally to the room temperature to obtain a bonded ceramic structure as shown in FIG. 9(c) having the bonding layers 4a and 4b.

The bonded ceramic structure was subjected to the same leakage test as that applied in Example 7.

No bubbles formed and the fluid-thickness was satisfactory.

The bonded ceramic structure was subjected also to the same cantilever bending strength test as that applied in Example 7. The strength was as high as 190 MPa.

EXAMPLE 16

A first perforated ceramic plate A employed in Example 16 is identical with that of Example 15, except that the diameter of the holes 11 thereof is 50.4 mm. A second perforated ceramic plate D employed in Example 16 is identical with that of Example 15, except that the diameter of holes 11' thereof is 40 mm.

Ceramic tubular members B employed in Example 16 are identical with those of Example 15. The first perforated ceramic plate A, the second perforated ceramic plate D and the ceramic tubular members B were assembled and bonded together by the same processes as those employed in Example 15, except that the thickness of the bonding layers was about 0.2 mm.

The bonded ceramic structure thus produced was subjected to the same leakage test and the same cantilever bending strength test as those applied in Example 15.

No bubbles formed, the fluid-tightness was satisfactory, and the strength was as high as 200 MPa.

EXAMPLE 17

Figure 10A:
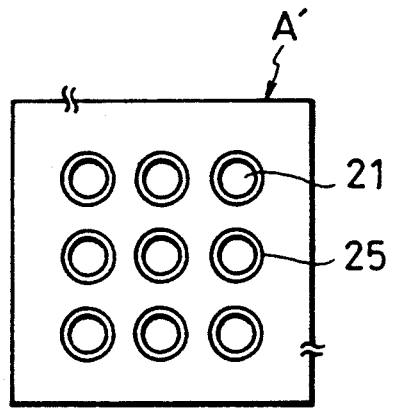
FIG. 10(a) is a plane view of a ceramic plate provided with stepped holes, employed in forming a bonded ceramic structure employing two ceramic plates in a preferred embodiment according to the present invention.
Figure 10B:
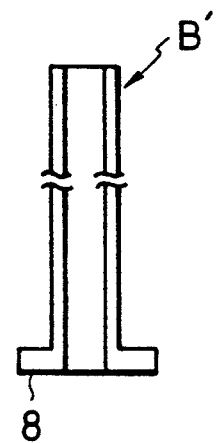
FIG. 10(b) is a sectional view of a ceramic tubular member provided at its one end with a flange, to be used in combination with the ceramic plate of FIG. 10(a)
Figure 10C:
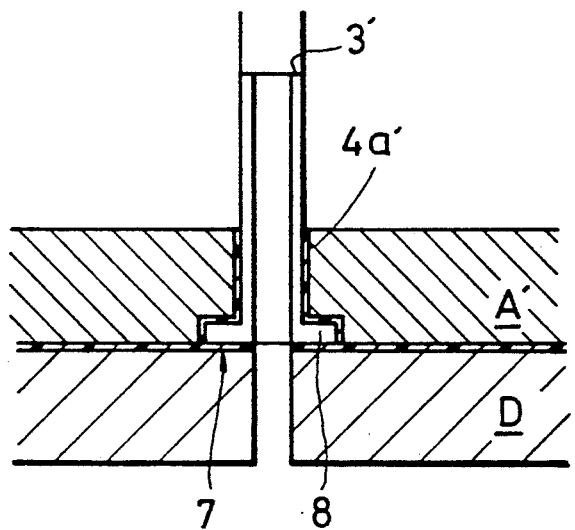
FIG. 10(c) is a fragmentary sectional view of a bonded ceramic structure comprising the ceramic plate of FIG. 10(a) and the ceramic tubular member of FIG. 10(b)

A first perforated ceramic plate A' as shown in FIG. 10 (a) of 700 mm × 700 mm × 100 mm was identical with the first perforated ceramic plate A of Example 15, except that the first perforated ceramic plate A was provided with holes 21 of 50.1 mm in diameter each provided with a counterbore of 60.1 mm in diameter and 5.1 mm in depth and arranged at a pitch of 75 mm.

A second perforated ceramic plate D was identical with that of Example 15. Flanged ceramic tubular members B' of 50 mm in outside diameter, 40 mm in inside diameter and 1000 mm in length was used. Each ceramic tubular member B' was provided at one end thereof with a flange 8 of 60 mm in outside diameter, 40 mm in inside diameter and 5 mm in thickness, Then, as shown in FIG. 10(c), the same bonding paste as that used in Example 15 was spread over one surface 7 of the second perforated ceramic plate D in a coat of about 0.05 mm in thickness and was spread on the surface and outer circumference of the flange 8, and a portion of each flanged ceramic tubular member B' to be received in the hole 21, the flanged ceramic tubular members B' were inserted in the holes 21 with the flanges 8 thereof seated on the bottom surfaces of the counterbores 25 and the second perforated ceramic plate D was attached to the surface of the first perforated ceramic plate A' in which the flanges 8 are exposed, and then the assembly of the first perforated ceramic plate A', the second perforated ceramic plate D and the flanged ceramic tubular members B' was fired in an atmosphere of nitrogen gas to obtain a bonded ceramic structure as shown in FIG. 10(c).

The bonded ceramic structure thus fabricated was subjected to the same leakage test and the same cantilever bending strength test as that applied in Example 7.

No bubbles formed, the fluid-tightness was satisfactory and the strength was as high as 220 MPa.

COMPARATIVE EXAMPLE 7

A perforated ceramic plate A employed in Comparative example 7 was identical with that of Example 15, except that the diameter of holes 11 formed in the perforated ceramic plate A was 51.4 mm.

The same ceramic tubular members B as those of Example 15 were used.

A bonded ceramic structure as shown in FIG. 3 was fabricated by the same process as that employed in Comparative example 1.

Since the clearance between the perforated ceramic plate A and the ceramic tubular member B was as large as 0.7 mm, the ceramic tubular members B were inclined as large inclinations towards the perforated ceramic plate A and the positional accuracy of the ceramic tubular members B was very low.

The bonded ceramic structure was subjected to the same leakage test as that applied in Example 15. Bubbles formed and the fluid-tightness was unsatisfactory.

Also, the bonded ceramic structure was subjected to the cantilever bending strength test. The strength was as low as 90 MPa.

As is obvious from the test of Examples 15 to 17, a bonded ceramic structure comprising a first perforated ceramic plate provided with holes, ceramic tubular members inserted in the holes of the first perforated ceramic plate, and a second perforated ceramic plate provided with holes and attached to the outer surface of the first perforated ceramic plate with the holes thereof aligned coaxial respectively with those of the first perforated ceramic plate has a uniform bonding layer continuously extending between the first and second perforated ceramic plates and in the clearances between the first perforated ceramic plate and the tubular ceramic members, which provides the bonded ceramic structure with excellent fluid-tightness and high bonding strength, and enables the plurality of ceramic tubular members arranged in the same direction by length to be bonded to the first perforated ceramic plate at high positional accuracy.

What is claimed is:

1. A bonded ceramic structure having a high positional accuracy and a high bonding strength comprising:

a perforated ceramic plate member having a plurality of holes;

ceramic tubular members each having at least one end inserted in said holes each with a predetermined clearance between an outer circumference thereof and a surface of the corresponding hole, wherein each of the clearances is filled with an inorganic bonding material forming an inorganic bonding layer so that the ceramic tubular members are fixedly bonded to the plate member; and a second inorganic bonding layer consisting essentially of said inorganic bonding material provided on the surface of the side of said perforated ceramic plate member facing said ceramic tubular members, said second inorganic bonding layer being continuously connected to said inorganic bonding layer, and said second inorganic bonding layer having a thickness of 0.2-2.5 mm.

2. A bonded ceramic structure having a high positional accuracy and a high bonding strength comprising:
- a perforated ceramic plate member having a plurality of holes;
- ceramic sleeve members each fitted in the holes each with a predetermined clearance between an outer circumference thereof and a surface of the corresponding hole;
- ceramic tubular members each having one end inserted into the ceramic sleeve, wherein each of said clearances is filled with an inorganic bonding material forming an inorganic bonding layer so that the ceramic tubular members are fixedly bonded to the plate member; and
- a second inorganic bonding layer consisting essentially of said inorganic bonding material provided on the surface of the side of said perforated ceramic plate member facing said ceramic tubular members, wherein said second inorganic bonding layer is continuously connected to said inorganic bonding layer, and said second inorganic bonding layer has a thickness of 0.2-2.5 mm.

3. The bonded ceramic structure of claim 2, wherein each ceramic sleeve is fitted in a counterbore formed in one end of each hole and a thermal expansion coefficient of said ceramic sleeve member is between that of said perforated ceramic plate member and that of said ceramic tubular member.

4. The bonded ceramic structure of claim 3, wherein said inorganic bonding material consists essentially of 80.5 wt % $SiO_2$, 12.9 wt % $B_2O_3$, 3.8 wt % $Na_2O$, 0.4 wt % $K_2O$ and 2.2 wt % $Al_2O_3$.

5. The bonded ceramic structure of claim 1, wherein said inorganic bonding material consists essentially of 80.5 wt % $SiO_2$, 12.9 wt % $B_2O_3$, 3.8 wt % $Na_2O$, 0.4 wt % $K_2O$ and 2.2 wt % $Al_2O_3$.

6. A bonded ceramic structure having a high positional accuracy and a high bonding strength comprising:
- a perforated ceramic plate member having a plurality of through holes;
- ceramic tubular members arranged transversely in one side of said perforated ceramic plate member, one end of each ceramic tubular member being inserted into said through holes with predetermined clearances between an outer circumference thereof and a surface of said through holes;
- an inorganic bonding material in said predetermined clearances fixedly bonding said ceramic tubular members to said perforated ceramic plate member; and
- an inorganic bonding layer consisting of said inorganic bonding material provided on the surface of said side of said perforated ceramic plate member, wherein said inorganic bonding material in said clearances is continuously connected to said inorganic bonding layer and said inorganic bonding layer has a thickness of 0.2-2.5 mm.

7. The bonded ceramic structure of claim 6, wherein the holes of said perforated ceramic plate member are tapered, and the outer configuration of each said ceramic tubular member is formed in a tapered shape conforming to the tapered hole in which said ceramic tubular member is fitted, and a cantilever bending strength of said bonded ceramic structure is approximately 208 MPa.

8. The bonded ceramic structure of claim 6, wherein the holes of said perforated ceramic plate member are stepped, and the outer configuration of each of said ceramic tubular members is formed in a stepped shape conforming to the stepped hole in which said ceramic tubular member is fitted, and a cantilever bending strength of said bonded ceramic structure is approximately 190 MPa.

9. The bonded ceramic structure of claim 6, further comprising an internal thread formed in the surface of each hole of said ceramic plate member to engage an external thread formed in the outer circumference of the end portion of each said ceramic tubular member, and a cantilever bending strength of said bonded ceramic structure is approximately 250 MPa.

10. The bonded ceramic structure of claim 6, wherein said perforated ceramic plate member and said ceramic tubular members consist essentially of silicon nitride.

11. The bonded ceramic structure of claim 6, further comprising:
- a second perforated ceramic plate member, laminated on a surface of said perforated ceramic plate member opposite to said ceramic tubular members, and provided with second through holes, wherein each of said second through holes is coaxial with corresponding through holes in said perforated ceramic plate member, a diameter of each said second through hole is at least equal to the inside diameter of said tubular member inserted into said through hole coaxial with said second through hole, a diameter of each said second through hole is no greater than the outside diameter of said tubular member inserted into said through hole coaxial with said second through hole, and a bottom end of each said ceramic tubular member inserted into said through hole is flush with the surface of said perforated ceramic plate member facing said second perforated plate member; and
- a second inorganic bonding layer consisting essentially of said inorganic bonding material provided between said perforated ceramic plate and said second perforated plate wherein said inorganic bonding material in said clearances is continuously connected to said second inorganic bonding layer.

12. The bonded ceramic structure of claim 6, wherein said inorganic bonding material consists essentially of 80.5 wt % $SiO_2$, 12.9 wt % $B_2O_3$, 3.8 wt % $Na_2O$, 0.4 wt % $K_2O$ and 2.2 wt % $Al_2O_3$.

13. A bonded ceramic structure having a high positional accuracy and a high bonding strength comprising:
- a perforated ceramic plate member having a plurality of through holes;
- ceramic sleeve members fitted into said through holes with predetermined clearances between an outer circumference thereof and a surface of said holes;
- ceramic tubular members arranged transversely in one side of said perforated ceramic plate member, one end of each ceramic tubular member being inserted into said ceramic sleeve members;
- an inorganic bonding material in said predetermined clearances fixedly bonding said ceramic tubular members to said perforated ceramic plate member; and an inorganic bonding layer consisting essentially of said inorganic bonding material provided on the surface of said side of said perforated ceramic plate member, wherein said inorganic bonding material in said clearances is continuously connected to said inorganic bonding layer and said inorganic bonding layer has a thickness of 0.2-2.5 mm.

14. The bonded ceramic structure of claim 13, wherein the holes of said perforated ceramic plate member are tapered, and the outer configuration of each of said ceramic sleeve members is formed in a tapered shape conforming to the tapered hole in which said ceramic tubular member is fitted, a thermal expansion coefficient of said ceramic sleeve member is between that of said perforated ceramic plate member and that of said ceramic tubular members, and a cantilever bending strength of said bonded ceramic structure is approximately 200 MPa.

15. The bonded ceramic structure of claim 13, wherein the holes of said perforated ceramic plate member are stepped, and the outer configuration of each of said ceramic sleeve members is formed in a stepped shape conforming to the stepped hole in which said ceramic tubular member is fitted, a thermal expansion coefficient of said ceramic sleeve member is between that of said perforated ceramic plate member and that of said ceramic tubular members, and a cantilever bending strength of said bonded ceramic structure is approximately 230 MPa.

16. The bonded ceramic structure of claim 13, further comprising an internal thread formed in the surface of each hole of said ceramic plate member to engage an external thread formed in the outer circumference of the end portion of each said ceramic tubular member, a thermal expansion coefficient of said ceramic sleeve member is between that of said perforated ceramic plate member and that of said ceramic tubular members, and a cantilever bending strength of said bonded ceramic structure is approximately 230 MPa.

17. The bonded ceramic structure of claim 13, wherein said perforated ceramic plate member, said ceramic sleeve members and said ceramic tubular members consist essentially of silicon nitride.

18. The bonded ceramic structure of claim 13, wherein said inorganic bonding material consists essentially of 80.5 wt % $SiO_2$, 12.9 wt % $B_2O_3$, 3.8 wt % $Na_2O$, 0.4 wt % $K_2O$ and 2.2 wt % $Al_2O_3$.

* * * * *